(No Model.)
J. B. MOORE.
APPARATUS FOR FILTERING LIQUIDS.
No. 251,624.  Patented Dec. 27, 1881.
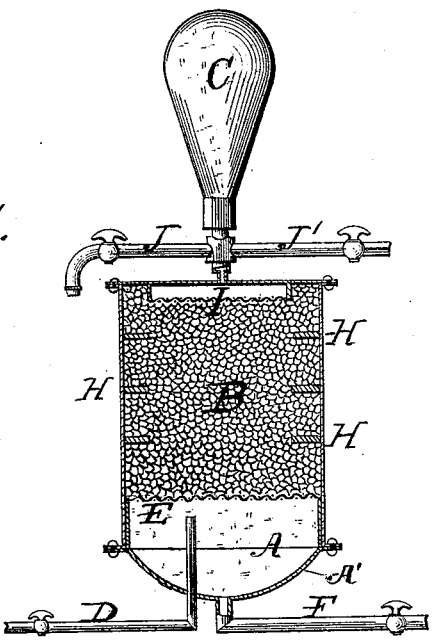
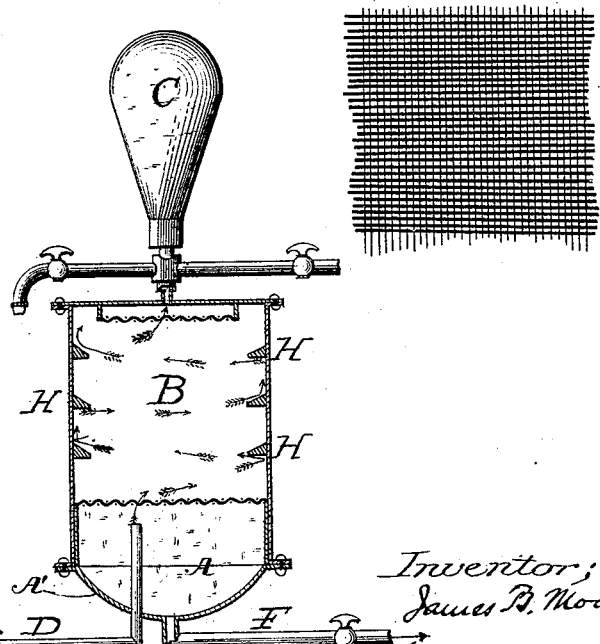

UNITED STATES PATENT OFFICE.

JAMES B. MOORE, OF NEW ORLEANS, LOUISIANA.

APPARATUS FOR FILTERING LIQUIDS.

SPECIFICATION forming part of Letters Patent No. 251,624, dated December 27, 1881.

Application filed January 6, 1881. (No model.)

*To all whom it may concern:*

Be it known that I, JAMES B. MOORE, a citizen of the United States, residing at New Orleans, in the parish of Orleans and State of Louisiana, have invented certain new and useful Improvements in Apparatus for Filtering and Rectifying Liquids, of which the following is a specification.

This invention relates to apparatus for filtering and rectifying liquids and for separating the solid matter which may be held in suspension by the liquid; and the objects of the invention are to improve the construction and mode of operation of that class of filters in which the liquid is forced upward through the filtering material under considerable pressure; to provide a filtering and rectifying apparatus in which the agitation and remingling of the accumulated sediment in the sediment-chamber is avoided; to direct the current of liquid from the sides of the filtering-vessel and cause it to flow horizontally across the filter and through the filtering material, thereby increasing the effectiveness of the apparatus; to prevent clogging of the sediment and filtering material, and to flush the filter with filtered liquid by air-pressure generated in an air-chamber connected with the filtering-vessel. These several objects I accomplish by the construction and arrangement of filtering apparatus illustrated in the accompanying drawings, in which—

Figure 1 represents a vertical sectional view of a filtering apparatus constructed according to my invention; Fig. 2, a similar view with the filtering material removed from the vessel to more clearly illustrate the course of the liquid through the vessel, and Fig. 3 a plan view of a portion of a filtering-strainer constructed according to my invention.

In the drawings, the letter B indicates an upright vessel, which is furnished with a horizontal closed top portion, and is charged with the filtering material, as shown in Fig. 1. This filtering material is tightly packed by ramming or tamping, and is sustained at its bottom portion by means of the horizontal corrugated strainer E, below which is formed the sediment-chamber A, the bottom wall of which is formed of a detachable concavo-convex plate, A', of metal, suitably flanged and bolted around its outer edge to the vessel B. The bottom wall or plate of the sediment-chamber is centrally perforated to receive the end of the eduction or blow-off pipe F, which latter does not project within the sediment-chamber, and through the bottom wall or plate of the latter is introduced the induction or liquid-supply pipe D, which projects vertically or upwardly into and through the sediment-chamber, and terminates immediately below the filtering-strainer E. Within the filtering material are arranged a series of deflecting-plates, H, of suitable non-corrosive material, and the under sides or bottom deflecting-faces are arranged at right angles to the axis of the filter, which construction and arrangement subserve very important functions, in that the current of liquid is not only deflected from the side walls of the filtering-vessel, but is caused to pass horizontally across and through the filtering material, thereby compelling it to cross and recross the filter, which has the effect of compounding or greatly increasing the effective operation of the filter and rendering every portion of the filtering material available in the operation of the apparatus, instead of a small portion at the sides or in the center only. The peculiar traversing course of the liquid current is illustrated by the arrows shown in Fig. 2, and I have demonstrated by practical operation of the apparatus that the liquid current traverses the filtering material in the manner described.

In practice the liquid, in its upward course under pressure, seeks the side walls of the vessel, and, there meeting the horizontal under sides of the deflecting-plates, is turned inward at right angles to the axis of the filter, and thereby forced toward the center of the filter, after which it is projected in right lines across the filter to the opposite side, this direction in a right line being to a small extent only varied by a tendency to a general upward rise, which is due to the fact that the outlet at the top of the filter causes the pressure to lessen or weaken as the liquid rises. By this combined action of traversing movements I am enabled to operate the apparatus under exceedingly heavy pressure and perform the filtering and rectifying operation in a very superior manner.

At the top portion of the filter is arranged a filtering-strainer, I, sustained away from the top of the filter, for the purpose of retaining the filtering material in place. The upper and the lower filtering-strainers are formed of wirecloth, woven of brass or other metal, with the warp and woof of such unequal size as to constitute corrugated faces, the object of which construction is to avoid or prevent decaying of the strainer, as when made of animal or vegetable fibers, and, further, to avoid the serious objection heretofore experienced in using metal cloth of a sufficient firmness of gauze, in that the corrugations effectually prevent clogging of the sediment and filtering material.

A very important feature of the filtering apparatus consists in providing the concavo-convex bottom wall of the sediment-chamber with a central eduction or blow-off pipe which has communication with but does not project into the sediment-chamber, and in arranging the induction or liquid-supply pipe to project into and through the sediment-chamber and terminate immediately below the filtering strainer E. By this arrangement the sediment collects toward the center of the sediment-chamber at the mouth of the eduction or blow-off pipe, and the inflowing liquid to be filtered is delivered within the filter at a point adjacent to the strainer E and above the level or height of the sediment contained in the sediment-chamber, whereby I effectually avoid and prevent agitation and remingling of the sediment, which is of great importance in the art, and provides means for perfectly filtering and rectifying liquids.

An air chamber or reservoir, C, is connected with the top portion of the filter, and adjacent to the point of connection of the air-chamber and filter I connect the usual service discharge-pipes, J J'. The air chamber or reservoir may be of any desired form or construction, and its special function is to enable the filter to be flushed with filtered water by the pressure of air generated in the air-chamber, in the manner I will now describe in detail.

When it is desired to flush the filter the outlet or discharge pipes J J' are closed by means of suitable cocks, and the liquid is inducted into the filter by the induction-pipe D, the filter being filled with liquid until an air-pressure is generated in the chamber or reservoir C and at the top portion of the filter which is equal to the pressure of the inflowing liquid, after which the supply-pipe is closed by a suitable cock to cut off the further supply of liquid. The eduction or blow-off pipe F is then opened by means of a suitable cock, whereby the pressure of the accumulated air in the air chamber or reservoir and in the upper portion of the filter will force the filtered liquid downward through the filter, and through the sediment-chamber, and out through the eduction or blow-off pipe F, thereby thoroughly washing and cleansing both the filtering material and the sediment-chamber and driving off all collected impurities.

By reason of the central location of the eduction-pipe in the concavo-convex bottom the sediment-chamber can be cleaned of every particle of sediment, because the latter is by gravity directed to the mouth of the eduction-pipe.

Heretofore an apparatus for filtering water has been provided with a downwardly-curved bottom chamber having a vertical wall at one side, through which extend an upper induction or water-supply pipe and a lower eduction or discharge pipe, the inflowing water being delivered in a line parallel to the under face of a filtering-strainer; but such construction does not constitute my invention.

In my structure the construction of the filter-bottom and the arrangement of the induction and the centrally-located blow-off pipe are such that I entirely avoid the use of separate chambers and deflecting-valves to direct the liquid to the filtering-strainer, and I effectually prevent agitation or remingling of the sediment, while the latter is always directed by gravity to the mouth of the blow-off cock at the center of the concavo-convex bottom, which produces important results, as hereinbefore mentioned.

What I claim is—

1. An apparatus for filtering and rectifying liquids, embodying in its structure the combination of the following elements, namely: a vessel charged with filtering material, supported by a bottom filtering-strainer, below which is formed a sediment-chamber having a concavo-convex bottom wall centrally perforated and connected with an eduction or blow-off pipe, and an induction or liquid-supply pipe extending upwardly through the sediment-chamber and terminating adjacent to the filtering-strainer, substantially as described, whereby the liquid can pass to the filter without agitating or remingling the sediment in the sediment-chamber, as set forth.

2. The improved filter hereinbefore described, consisting of the filtering-chamber, with the plates H and strainers E and I, the sediment-chamber A, with the induction and eduction arranged as described, and the air-chamber C, with the service-pipes.

3. The combination, with a filtering-vessel having bottom induction and eduction pipes and valves, of an air chamber or reservoir for flushing purposes, as described, connected with the upper portion of the vessel, and with the service discharge-pipes, substantially as and for the purposes described.

In testimony whereof I affix my signature in presence of two witnesses.

JAMES BRADNER MOORE.

Witnesses:
ANDREW HERO, Jr.,
JNO. J. WARD.